F. LATULIP.
JOURNAL BEARING.
APPLICATION FILED FEB. 18, 1909.
934,551.                                              Patented Sept. 21, 1909.
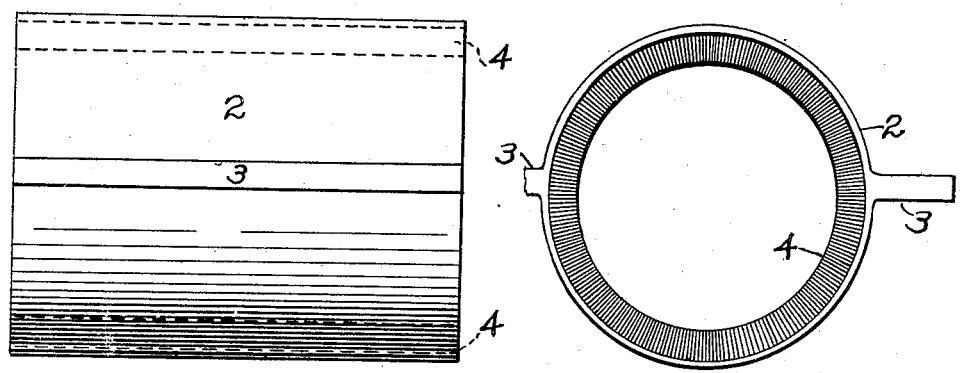
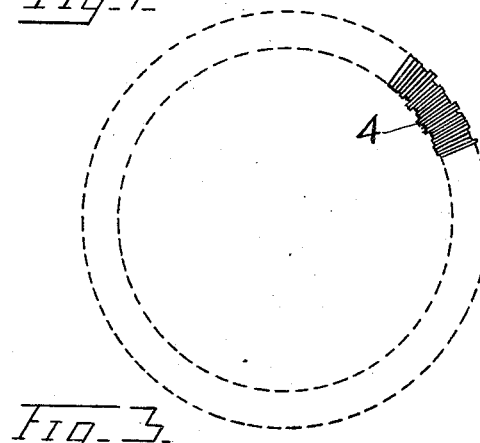
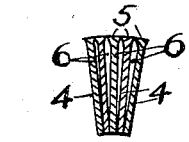
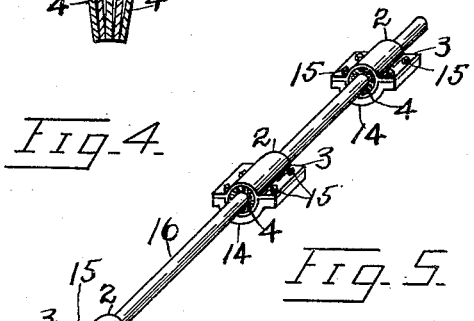
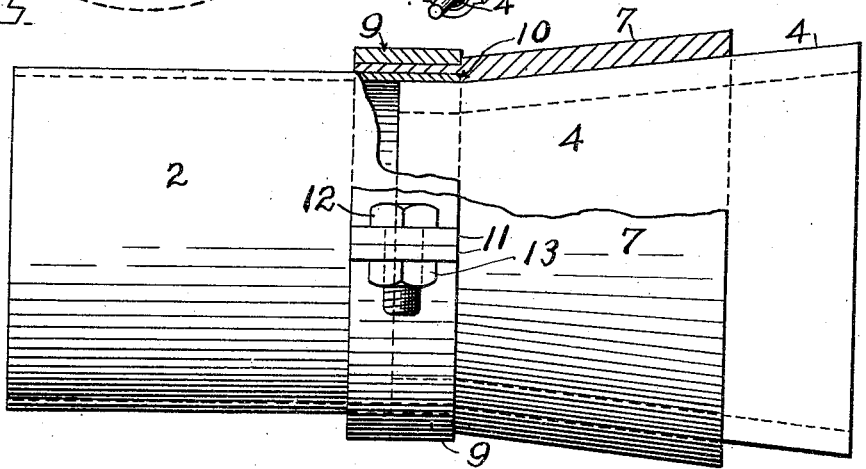
Witnesses:                Fig. 6.                Inventor,
                                                 Fred Latulip
                                          By Harry D. Wallace
                                                 Attorney.

United States Patent Office.

FRED LATULIP, OF SYRACUSE, NEW YORK, ASSIGNOR OF ONE-HALF TO DONALD F. McLENNAN, OF SYRACUSE, NEW YORK.

JOURNAL-BEARING.

934,551.  Specification of Letters Patent.  Patented Sept. 21, 1909.

Application filed February 18, 1909. Serial No. 478,543.

*To all whom it may concern:*

Be it known that I, FRED LATULIP, a citizen of the United States, residing at Syracuse, in the county of Onondaga and State of New York, have invented certain new and useful Improvements in Journal-Bearings, of which the following is a specification.

This invention relates to improvements in bearings, designed for use in connection with all kinds of journals, as shafts, axles and spindles, and has for its object to provide a simple, durable and inexpensive bearing, which is composed of a material that is a non-conductor of heat, and practically frictionless.

The invention consists principally of a one-part metallic bearing box in the form of a sleeve or tube, which is provided with lateral flanges for suitably attaching the same to the supports of journal boxes.

The invention further consists of a bushing of mica, which is fitted into the sleeve and forms the direct bearing for a shaft or journal, the said bushing preferably composed of a number of thin strips or layers of mica, of equal length and width, closely and evenly arranged in radial order. The mica strips being assembled in the form of a tube, and the laminæ compressed until the wall of the bushing or tube becomes a solid composite mass, which is inserted in the sleeve-box under a strong pressure, in such manner as to remain in working position and withstand the strain and wear of a bearing without any other securing means, and without requiring renewing or repairing except after long periods of use.

Other features and parts of the invention will be understood from the detail description which follows, and by reference to the accompanying drawing forming a part of this specification, and in which—

Figure 1 is a side view of the sleeve or shell, which forms the external part of my journal bearing. Fig. 2 is an end view of the same, showing the manner of applying the mica bushing which forms the direct bearing for a shaft or journal. Fig. 3 is a view illustrating the manner of assembling the mica strips preparatory to compressing and applying the same to the tubular box. Fig. 4 is an enlarged view of a number of mica strips, showing in exaggerated form the manner of upsetting or flaring the outer edges of the strips to facilitate forming the same into a tube; also showing the spaces between the layers which may be filled with a lubricant. Fig. 5 is a perspective view of a shaft, to which are applied a number of the sleeve bearings. Fig. 6 is a side elevation and part section, showing the manner in which the mica bushing is compressed and applied to the tubular casing.

Similar characters of reference are assigned to corresponding parts throughout the several views.

In the drawing, 2 represents a one-part sleeve or tubular bearing case or box, which is provided with opposite lateral flanges 3, by means of which the case may be attached to a pillow-block or other member of a bearing support. The sleeve or case 2 may be made of any suitable kind of metal, by casting, drawing or otherwise, to form an integral tube-like part, as shown. The flanges 3 may be dispensed with and any suitable method of supporting the bearing may be employed instead.

4 represents a bushing of mica which is disposed in the case or sleeve 2 and preferably arranged truly concentric to the case. This bushing is composed of a large number of strips or layers of sheet mica, either natural or what is called "micalene," all of the strips are preferably cut to uniform length and width but may vary in thickness. After the strips of mica are cut to uniform size, they are assembled, by means of cylindrical core or form (not shown) into a simple tube-like part, having a diameter considerably greater than the bore of the sleeve 2, as shown in Fig. 3. In this stage of the manufacture, the layers or strips of mica are merely aggregated by hand and are rather loosely disposed around the core. When a sufficient number of the strips are thus arranged for a certain sized bearing, the imperfect and unfinished bushing is removed from the core, and subjected to a pressure which contracts the shell sufficiently to be inserted into the sleeve-like box or case 2. A heavy pressure is employed for this latter operation, which crowds the mica sheets still more closely together as it drives the shell 4 into the sleeve. After the mica is thus forced into the sleeve, it is practically immovable. That is to say, it will retain its position and form perfectly and cannot be displaced except by the application of a strong pressure. By this method of constructing and applying the mica bushing, this part becomes the direct bearing for a shaft or journal, no part of the metal of the sleeve or box coming in contact with the shaft.

In Fig. 4 is shown, in exaggerated form, the manner of preparing the mica strips, before they are assembled into the large loosely constructed tube, illustrated in Fig. 3. To prepare the mica strips, as shown, the edges 5, which later form the outer circumference of the bushing, are scraped by some dull instrument, which chafes and flares the edges, and gives them an upset form. When the strips are thus treated the outer edges 5 appear to be thicker than the body and opposite edges of the strips, and when a number of strips are placed side by side they may be readily assembled into a circular part or tube, each layer disposed in a radial plane, as shown in the drawing. The flaring of the outer edges of the strips also provides a series of narrow openings or cavities 6, extending longitudinally between the adjacent strips. These cavities are quite noticeable at the time of assembling, and just before entering upon the latter operation, the operator takes several of the strips and after adjusting them, as shown in Fig. 4, dips them into a lubricant such as melted tallow or other oil, which fills the cavities 6. He then places the strips in the form, and repeats this operation until he has built up the large loosely formed bushing shown in Fig. 3. When he has completed the assembling of the part 4, to prevent collapse of the same he places a suitable clamp (not shown) around the mica shell, which is then ready for insertion in the sleeve 2. The next step consists of taking a sleeve, and a funnel-shaped guide or receiver 7, specially arranged for the work, which is secured to one end of the sleeve by means of a clamp 9 (see Fig. 6), a shoulder 10 at the smaller end of the funnel or guide abutting against the end of the sleeve. The clamp consists of the band 9, having lateral flange-lugs 11, which are perforated to receive a bolt 12, to which is applied a nut 13, the arrangement of the funnel being such that the bore at the small end coincides exactly with the bore of the sleeve. After the funnel is applied to the sleeve, the loosely formed mica bushing 4 is placed into the large end of the funnel, and a strong pressure is then applied to its outer end for forcing the bushing through the funnel and into the sleeve. The pressure thus employed owing to the gradual contraction of the funnel, serves to compress and contract the inner end of the mica tube, and in this manner forces the strips or layers tightly against each other until the whole bushing becomes one solid mass. The insertion of the mica into the sleeve under compression serves to close up the cavities 6 between the several layers and forces the lubricant in every direction until the whole mass of mica is saturated. In this manner a considerable quantity of the oil or tallow remains confined in the walls of the bushing 4 and tends to render the same self lubricating for an indefinite period.

In Fig. 5 is illustrated the manner of applying my improved bearing to a shaft. In this view are shown three of the bearings mounted upon pillow blocks 14 and secured in place by screws or bolts 15, and the shaft 16 is inserted through the several bearings. In this connection it may be well to state that my bearings are preferably intended to be applied to shafts without requiring any specially formed journals, the bore in the mica bushing being preferably the same as the diameter of the shaft.

My improved journal bearing is extremely simple in construction, and when properly made and applied is capable of a long wearing life. The mica is a non-conductor of heat, and is therefore incapable of becoming heated to the point of fusing, and the layers of the mica being arranged at right angles to the direction of motion of a journal and tightly compressed and saturated throughout with a lubricant renders the bearing practically frictionless and indestructible.

Having thus described my invention, what I claim as new and desire to secure by Letters Patent, is—

1. A journal bearing, consisting of multiple sheets of mica formed into a composite sleeve, the corresponding edges of said sheets being upset to form a series of cavities between the sheets, and a tube-like metal casing inclosing and rigidly holding said sleeve.

2. A journal bearing, comprising a one-part sleeve-box, a mica bushing tightly fitted into the sleeve-box, the said bushing consisting of a series of thin strips of sheet mica of equal length and width, the outer edge of each strip being upset or flared laterally to correspond to the greater length of the outer circumference as compared with the inner circumference of said bushing.

3. The combination of a sleeve-like metallic casing in one part, and a journal bearing comprising a tubular mica part tightly fitting said casing, and having a concentric bore to receive the journal of a shaft, the said bearing composed of multiple layers of sheet mica disposed radially in said casing and each closely contacting the adjacent layer, the outer edge of each layer of mica being upset or flared to compensate for the increased length of the outer circumference as compared with the inner circumference of said tubular part.

In testimony whereof I affix my signature in presence of two witnesses.

FRED LATULIP.

Witnesses:
HARRY DE WALLACE,
FRANK F. BREWER.